Jan. 19, 1932. A. S. DICKERSON 1,842,251
PNEUMATIC WARMER FOR WINDSHIELDS
Filed Feb. 19, 1930 2 Sheets-Sheet 1

Inventor
ARTHUR S. DICKERSON
By Frank D. Gray
Attorney

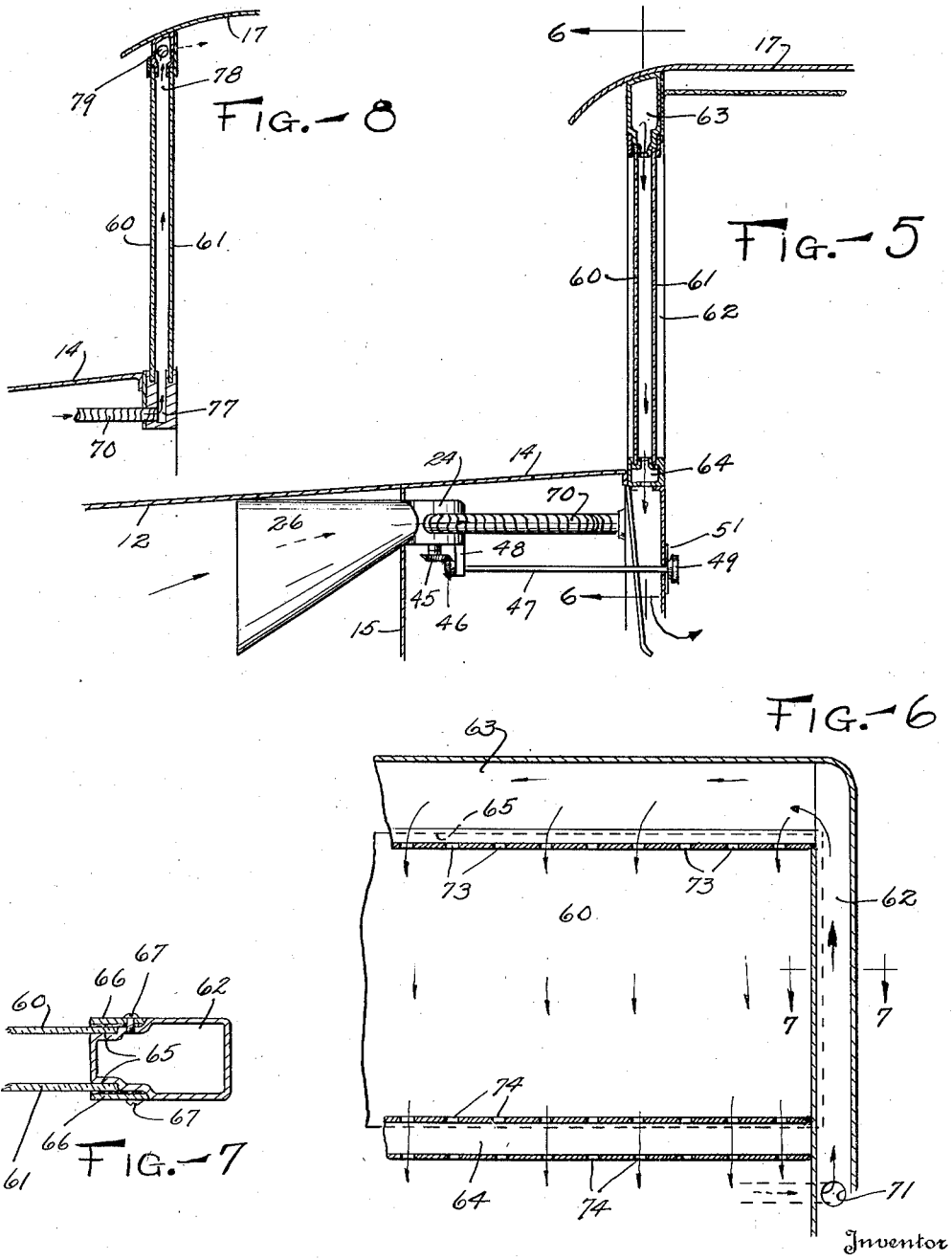

Patented Jan. 19, 1932

1,842,251

UNITED STATES PATENT OFFICE

ARTHUR S. DICKERSON, OF CHAGRIN FALLS, OHIO

PNEUMATIC WARMER FOR WINDSHIELDS

Application filed February 19, 1930. Serial No. 429,511.

This invention relates to pneumatic warmers for windshields and is especially adapted to prevent the forming and collecting of ice or steam on automobile windshields in cold weather. The general object of this invention is the provision of an apparatus which will prevent the forming and collecting of ice and steam on automobile windshields. A more specific object is the provision of an apparatus to utilize the excess heat of the motor to prevent ice collecting on the surfaces of automobile windshields or windows.

A further object is to provide an apparatus which will warm the windshield of an automobile and thereby prevent ice and steam forming on the windshield. Another object is the provision of an apparatus which will direct a current of air against the outer and inner surfaces of an automobile windshield to prevent ice and steam from forming thereon.

Another object of the invention is the provision of an apparatus which will pneumatically warm the windshield of an automobile in cold weather, in a manner which will insure clear vision to the driver or occupants of the automobile.

A further object, is the provision of an apparatus which will pneumatically prevent the formation of ice and steam on the windshield of a motor car, and which may simultaneously be used to heat the body of the car. Another object of this invention is the provision of an apparatus which will direct air, previously warmed by the motor, against the inner and outer surfaces of an automobile windshield, wherein the operator may readily control the apparatus to cause the air to be directed against either the inner or outer surfaces at will, or against the inner and outer surfaces simultaneously if desired. Another object is the provision of an apparatus, to accomplish the purposes theretofore set forth, and which will be simple in form, easily manufactured and readily applied.

Other objects of my invention will become apparent from the following description referring to a preferred embodiment illustrated in the drawings and the essential and novel characteristics will be set forth in the claims.

Referring to the drawings; Fig. 1 is a side elevation of an automobile, a preferred embodiment of my invention mounted thereon, certain parts being broken away to illustrate the internal construction, the plane of vision being substantially longitudinally through the driver's position.

Fig. 5 is a vertical section through a portion of an automobile and illustrates a modified form of my invention.

Fig. 6 is a vertical section and is indicated by the lines 6—6 in Fig. 5.

Fig. 7 is a horizontal section and is indicated by the lines 7—7 in Fig. 6.

Fig. 8 is a horizontal section taken in the same plane as Fig. 5, and illustrates a more simple form of the modification shown in Fig. 5.

Figure 1:
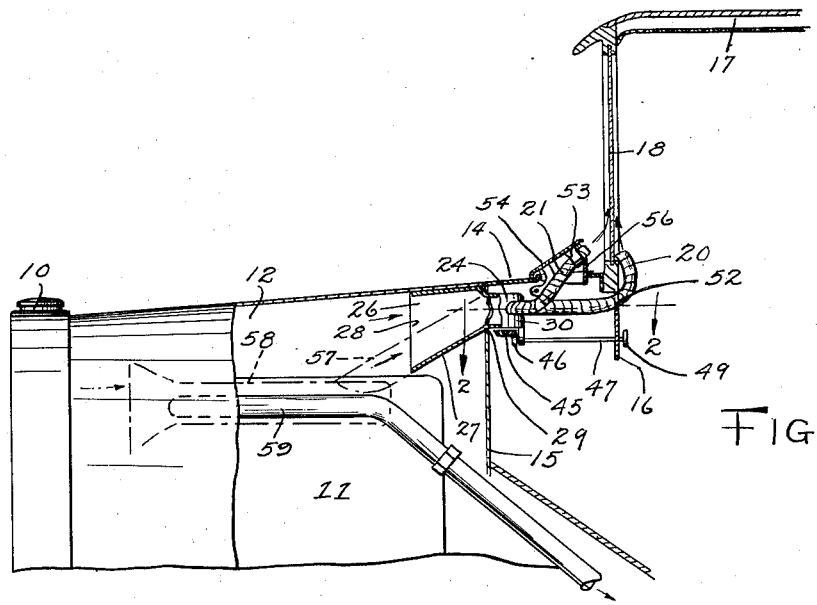

Referring again to the drawings, I have shown an automobile having the usual radiator 10, motor 11, motor housing 12, cowl 14, dash 15, instrument board 16, top 17 and windshield 18, mounted on a suitable chassis not shown. The parts just described are more or less diagrammatically shown and are illustrative of the construction usually found in motor driven vehicles. While I have shown my invention in conjunction with an automobile, it is readily adaptable to any type of motor driven vehicle.

In the embodiment illustrated in Fig. 1, heated air is conducted to both inner and outer surfaces of the single windshield by separate flexible metal tubes 20 and 21 respectively. These tubes are connected to outwardly extending flanges 22 and 23, respectively, of a cylindrical housing 24 mounted on its vertical axis upon the dash board 15 of the vehicle and beneath the cowl 14. Secured to the outwardly flared flange 25 of a lateral opening in the housing 24 is a forwardly extending open ended conduit, or duct, 26, having outwardly diverging sides 27 and a comparatively large opening 28 through which air or other gas, previously heated by the motor, enters the housing 24 and therefrom passes out through the tubes 20 and 21.

The housing 24, in the embodiment illustrated in Fig. 1, lies substantially beneath the cowl 14, while the conduit 26 passes through an opening 29 in the dash 15 and lies substantially within the motor housing or hood 12. However, it is contemplated that the conduit 26 may also lie in the vertical space between the dash and instrument board 16, the outer open end of the conduit being coincident with the opening 29 in the dash.

The valve or control unit 30 comprises a cylindrical shell 31, mounted coaxially in the housing 24. The cylinder has a lateral opening 33, adapted to coact with openings 34, 35 and 36 in the housing, which lead to the tubes 20 and 21 and the conduit 26 respectively. The cylinder 31 may be rotated, so that the opening 33 may be presented at one time to all three or any two openings in the housing.

Figures 2, 3:
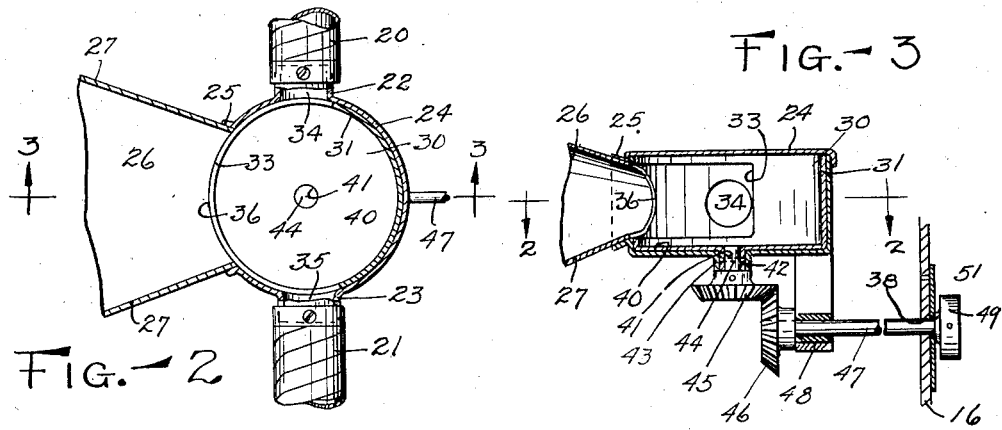
Fig. 2 is a horizontal section through the controlling mechanism and is indicated by the lines 2—2 in Fig. 1.
Fig. 3 is a horizontal section and is indicated by the lines 3—3 in Fig. 2.

To rotate the cylinder 31, I provide the cylinder with a base portion 40 which has a centrally located opening 41, having a downwardly extending flange 42 which passes through a flanged central opening 43 in the housing 24. Pinned to the flange 42 is a stub shaft 44, rigidly secured to which is a bevel gear 45 which meshes with a bevel gear 46, rigidly mounted on a horizontal control shaft 47. The shaft 47 is rotatably mounted in a bearing 48 secured to the housing 24, and extends rearwardly and outward through an opening 38 in the instrument board 16 as illustrated in Figs. 1 and 3. The shaft 47 is manually rotated by means of a knob 49, rigidly secured to the shaft immediately to the rear of the instrument board 16, upon which it is mounted, and from which the valve 30 is controlled.

Figure 4:
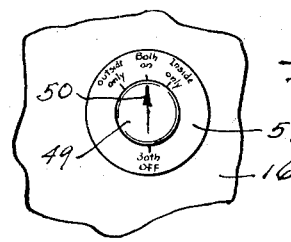
Fig. 4 is a partial elevation, looking from the right in Fig. 1 and illustrates the dial which controls the apparatus.

In order that the operator may easily inform himself of the position of the cylindrical valve 30 with reference to the openings in the housing 24, I prefer to emboss or imprint an indicator arrow 50 on the knob 49. A dial 51 rigidly secured to the instrument board is marked to indicate the relative positions of the knob 49 on the said dial and thereby readily indicate to the driver the various settings of the valve 30. As illustrated in Fig. 4 the valve 30 is positioned relative to the housing 24 so that the valve opening 33 will afford connection between the conduit 26 and the flexible tubes 20 and 21 and thereby force heated air to both the inner and outer surfaces of the windshield simultaneously.

The flexible tube 20 may be mounted in any suitable manner. In Fig. 1, I show the tube extending rearwardly from the housing 24 through a suitable opening 52 in the instrument board 16 and thence upwardly in a manner to direct the current of heated air toward the inner surface of the windshield. I find that it is advantageous to position the opening 52 and the end of the tube 20 substantially in front of the operator. This permits the heated air to be directed across the windshield, from corner to corner, the first contact of the heated air with the windshield, being immediately in front of the driver.

The flexible tube 21, in the embodiment illustrated in Fig. 1, extends from the housing 24 to a bracket 53 mounted on the underside of the cowl ventilator 54. I find that the tube may be supported in this manner without necessitating any changes in the body construction. If desired a shield 55 may be removably secured to the ventilator cover 54, in such a manner as to close the opening between the cover and the cowl, when the cover 54 is in an open position. The shield 55 is provided with a suitable opening 56, through which the tube 21 extends. It will be noted that when the cowl ventilator 54 is closed, the conduit 21 will open into the space beneath the cowl, thereby directing the heated air from both tubes simultaneously into the body of the vehicle to heat the latter.

As illustrated in Fig. 1, I show in broken lines a conduit 57 which may be substituted for the conduit 26 heretofore described. In this instance the conduit 57 leads to the valve 30 from a housing 58 which surrounds the exhaust manifold 59 of the motor and has its forwardmost ends flared outwardly to receive air direct from the fan. I find this method advantageous, as the air enters the housing 58 before it collects any motor gases. This installation raises the temperature of the air to a comparatively high degree. Therefore this modification is capable of supplying air which may be directed against both surfaces of the windshield, to prevent the formation of ice and steam thereon, and by the same double supply means heat the car in extremely cold weather.

Figs. 5, 6, and 7 illustrate a modified form of my invention which is especially advantageous in installations made in new motor cars during the process of manufacture. In this embodiment I form the windshield in two plates 60 and 61 of glass or other transparent material, spaced in parallelism a short distance apart. The windshield frame comprises boxlike pressed metal, vertical, side frame members 62 joined at their ends by hollow suitable top and bottom cross members 63 and 64 respectively. The windshield pane members 60 and 61 are retained in the inner recesses 65 in the frame members 62 by suitable clamping strips 66 which are retained in position by set screws 67.

In this modification I find, that it is not necessary to heat the outer face of the windshield, but that the passing of the heated air between the two members 60 and 61 of the windshield, is sufficient to prevent the formation of ice and steam. In this form of heater, the heater is operated by directing heated gases from the conduit 26 upward through one of the side hollow members 62—not directed into the cross members 63 or 64 at first—, and from 62 into the upper cross member 63, and thence downwardly toward the member 64.

As illustrated in Figs. 5 and 6 there is a flexible tube 70 leading from the housing 24 to an opening 71 in one of the hollow side frame members 62. The heated air thus travels from the motor housing 12 thru the conduit 26, the housing 24 and the tube 70, into the frame member 62 as shown in Fig. 6 which leads to one end of the upper cross member 63. There is no direct connection between the frame member 62 and the lower cross member 64. Openings 73 in the lower face of the cross member 63 permit the heated air to be directed downward between the two windshield members 60 and 61. Openings 74, in the upper and lower faces of the lower cross member 64, direct the air downward, this air gradually cooling and at the same time increasing in weight, into the cowl, where a deflector plate 75 deflects the current of air under the instrument board and into the body of the vehicle to heat the latter.

The hollow frame structure therefore forces the light warm air upward in one or both of the side members 62 (because there is no other exit for the air passing through the tube 70), and there passes between the panes 60 and 61; entering through the apertures 73 in the upper cross member and flowing out through the apertures 74 in the lower member 64, and thence into the cab body. In this form, no air is forced on the outside of either pane, nor does any current of air flow upwardly between the panes.

In Fig. 8 I show a modified form of the construction illustrated in Figs. 5, 6 and 7. In this instance a conduit 70 leads to an opening 77 in the lower frame member and directs the heated air upwards diagonally across and between the windshield members 60 and 61 to the side frame member 78 where it is exhausted to the exterior of the car through a suitable vent 79.

In this form the opening 77 in the lower member affords the only means of entrance of the air between the panes, and the vent 79 opposite the opening 77, is the only means of exit, so that the air current in the structure shown in Fig. 8 is upward as indicated in said view.

Having set forth the principles of my invention and described and illustrated an embodiment thereof for practical use, what I claim and desire to secure by Letters Patent is:—

1. A pneumatic windshield warming device comprising a source of supply of heated air spaced from one side of said windshield, a conduit leading from said source of supply toward said windshield, a valve associated with the end of the conduit opposite the valve, a conduit leading from the valve to the windshield, and directed against one side therefore, another conduit leading from said valve and directed against the other side, and means to control the valve.

2. A pneumatic windshield warming device comprising an outwardly flared conduit for heated air, a valve associated with the conduit and a pair of flexible conduits leading from the valve to the lower edge of the windshield, one of the flexible conduits being raised above the valve adjacent the windshield and directed toward one surface of the latter, the other of the said pair being directed underneath the said lower edge and then upward and toward the other surface, and manual means adjacent the windshield for controlling the said valve.

3. In a motor vehicle having a motor, a motor housing, a windshield, a windshield warmer comprising, a conduit for heated air, a valve associated with said conduit, a flexible tube leading from the valve to the inner surface of the windshield, a flexible tube leading from the valve to the outer surface of the windshield and means to operate the valve whereby the heated air may be directed against either the inner or outer surfaces of the windshield or against both inner and outer surfaces simultaneously, at the will of the operator.

4. In combination with a motor vehicle, a motor housing, a windshield and a substantially closed body, of a windshield warmer comprising a pair of flexible conduits mounted within the motor housing to direct air warmed by the motor rearwardly, the rear ends of said conduits being bent respectively, against the inner and outer surfaces of the windshield, and the conduit end near the inner surface being unobstructed so that the air directed against the windshield will be deflected to heat the air within the body.

5. A pneumatic windshield warming device comprising an open ended conduit, one end having outwardly diverging sides, a valve associated with the other end, a plurality of flexible conduits leading from the valve to the windshield, one of said conduits adapted to direct heated air rearwardly against the outer surface of the windshield the other conduit connected with said valve and having its other end directed forwardly against the inner surface, means adapted to control said valve and means adjacent the windshield and associated with said last named means adapted to indicate the position of the valve.

6. A pneumatic windshield warming device comprising an open ended conduit, one end having outwardly diverging sides, a valve associated with the other end, a pair of flexible conduits leading from the valve to the windshield, one of said conduits adapted to direct heated air against the outer surface of the windshield, the other conduit being adapted to direct heated air against the inner surface of the windshield, and means adapted to control said valve, to throw either or both of the flexible conduits into commission.

7. A pneumatic windshield warming device comprising an open ended conduit, one end having outwardly diverging sides, a cylindrical housing associated with the other end, a rotary valve in the housing, a plurality of flexible conduits leading from the housing toward the windshield, one of said conduits directed toward the windshield and adapted to direct heated air against the outer surface of the windshield, another of said conduits adapted to direct heated air against the inner surface of the windshield, means adapted to rotate said valve whereby the operator may open and close the conduits selectively, and means associated with said last named means adapted to indicate to the operator the position of the valve.

8. In combination with a motor vehicle having a motor, a motor housing, a windshield and a ventilator opening adjacent but outside the said windshield, of a windshield warmer comprising a conduit for heated air, one end of said conduit being secured to the ventilator, whereby, when the ventilator is open the conduit will direct the heated air against the outer surface of the windshield, and independent means adapted to close the ventilator opening to direct heated air from the conduit downward into the body of the vehicle.

9. In combination with a motor vehicle having a motor, a motor housing, a windshield comprising a plurality of spaced panes of transparent material mounted at their lower edges upon an apertured hollow member and supported at its upper edges by a hollow member having apertures in its lower wall, vertical side members for the windshield connecting the upper and lower hollow members, one of said side members being hollow and connected with the interior of said upper member, of a pneumatic windshield warmer comprising a conduit, adapted to convey heated air from the motor to the interior of the lower end of said hollow side member and thereby into the said upper member and thence into the space between the spaced panes and a deflector adapted to deflect such heated air from such space to the body of the vehicle.

10. In combination with a motor vehicle having a motor, a motor housing, a windshield comprising spaced panes of glass supported within a rectangular frame comprising upper and lower hollow members apertured on their inner edges to connect with the space between the panes, and one of the vertical members being hollow and having connection at its upper end with the upper apertured member and having its lower end extending down past its connection with the lower apertured hollow member, of a pneumatic windshield warmer comprising a conduit, one end of said conduit opening into the motor housing, the other end of said conduit opening into the said lower extension of the hollow side member which directs the heated air into the upper apertured hollow member and downward through its apertures into the space between the panes of glass, whereby air heated by the motor is directed downwardly through the windshield and between its panes, a rotary valve in said conduit, whereby the flow of air may be controlled and means adapted to rotate the valve.

11. In combination with a motor vehicle having a motor, a motor housing, a windshield comprising a pair of spaced panes of glass mounted upon a hollow cross bar and a hollow upper bar, with supporting solid side bars, of a windshield warmer comprising a conduit connecting said motor housing with said hollow cross bar, the said upper bar having an exit aperture, whereby air heated by the motor is forced upward through the windshield between the panes, and outward through said exit aperture.

In witness whereof, I have hereunto set my hand, this 17th day of February, 1930.

ARTHUR S. DICKERSON.